United States Patent [19]

Shultz, Jr.

[11] Patent Number: 4,790,191

[45] Date of Patent: Dec. 13, 1988

[54] COMPARATIVE MECHANICAL FAULT DETECTION APPARATUS AND CLAMP

[76] Inventor: William L. Shultz, Jr., 409 N. Lombard Ave., Lombard, Ill. 60148

[21] Appl. No.: 2,131

[22] Filed: Jan. 12, 1987

[51] Int. Cl.⁴ .......................................... G01N 29/04
[52] U.S. Cl. ...................................... 73/661; 73/660; 439/504
[58] Field of Search .............. 73/660, 661, 593, 118.1, 73/117.2; 439/504, 506, 507; 24/331, 332, 338, 346

[56] References Cited

U.S. PATENT DOCUMENTS

| | | | |
|---|---|---|---|
| 3,365,935 | 1/1968 | Kane | 73/661 |
| 4,345,807 | 8/1982 | Shekel et al. | 439/504 |
| 4,449,772 | 5/1984 | Johnson, III | 439/504 |
| 4,453,791 | 6/1984 | Ledbetter | 439/504 |

Primary Examiner—Jerry W. Myracle
Assistant Examiner—Louis M. Arana
Attorney, Agent, or Firm—Mason, Kolehmainen, Rathburn & Wyss

[57] ABSTRACT

A device for determining a mechanical fault in an automotive vehicle by determining mechanical vibrations comparatively between two like points on the vehicle to determine which of two automotive devices is in need of repair or replacement. The device includes two piezoelectric devices operatively secured to a pair of mechanical clamps capable of being attached to two like points on the automotive vehicle.

9 Claims, 3 Drawing Sheets

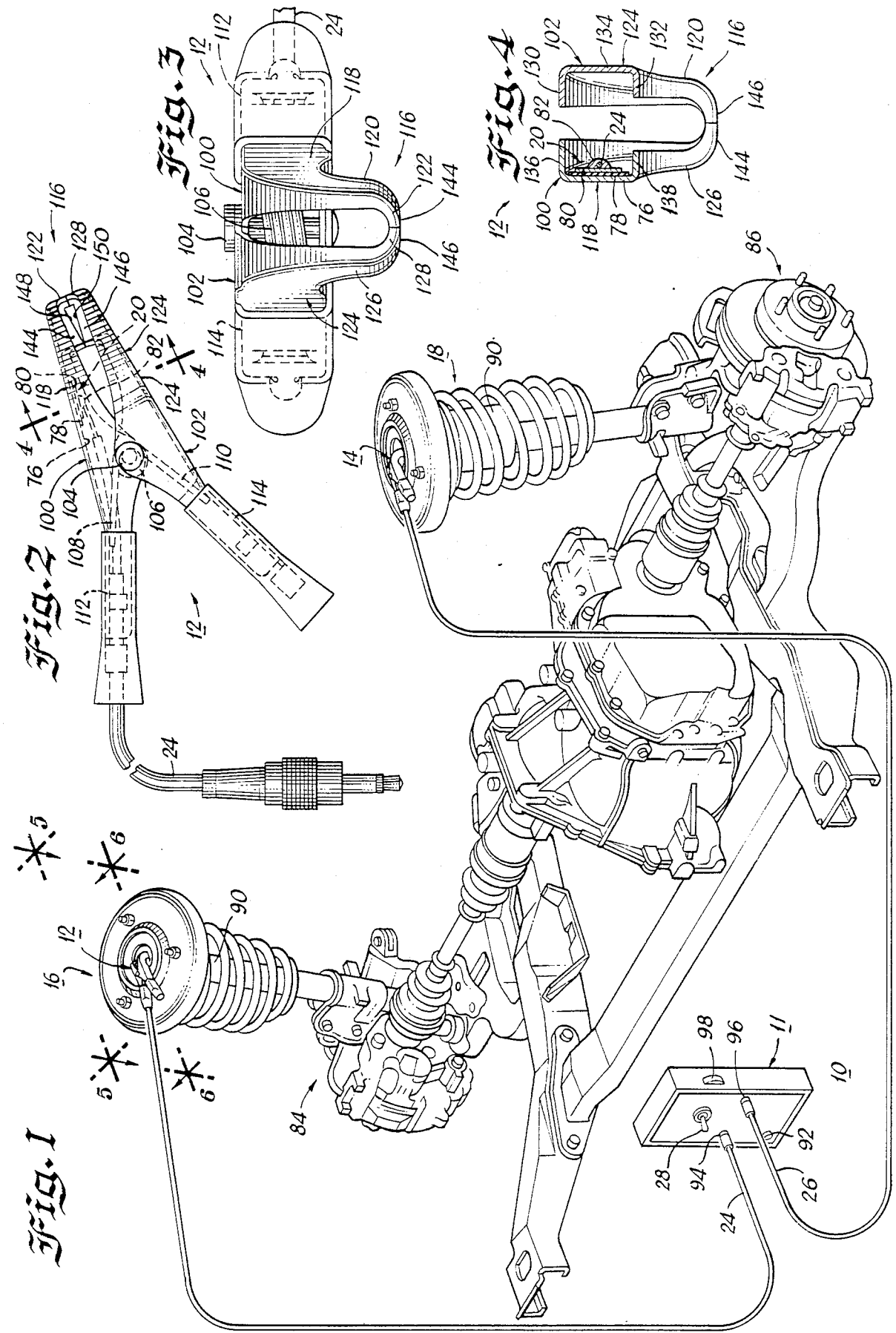

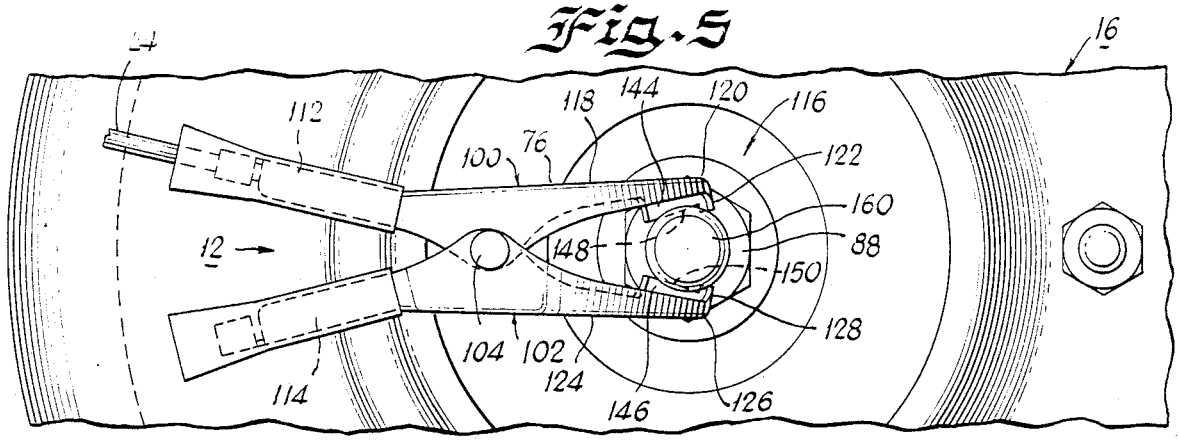

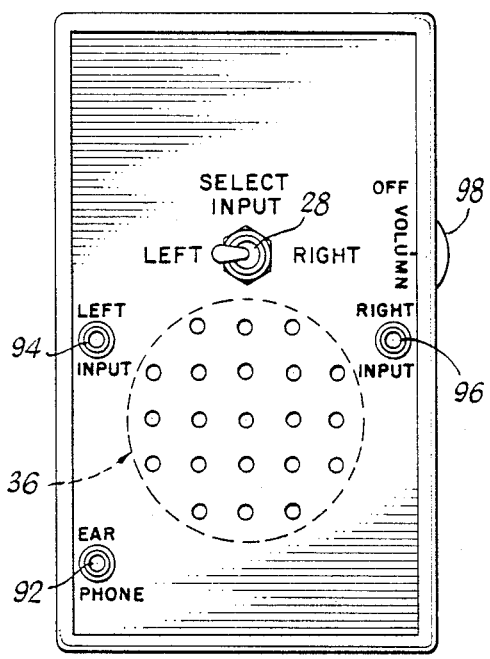
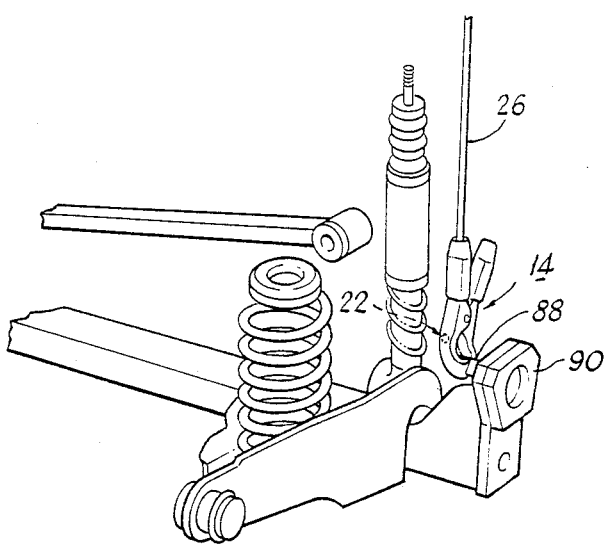
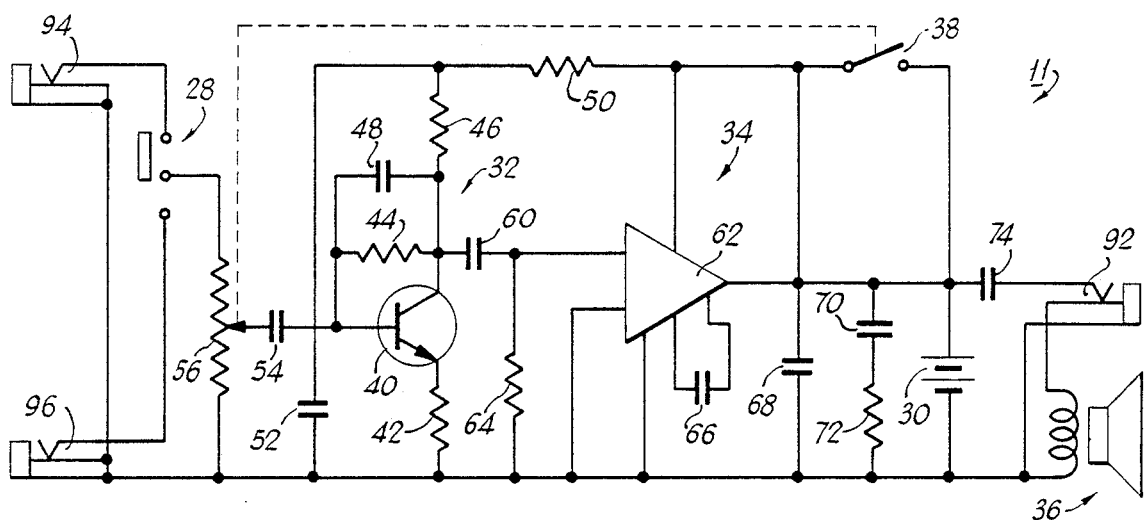
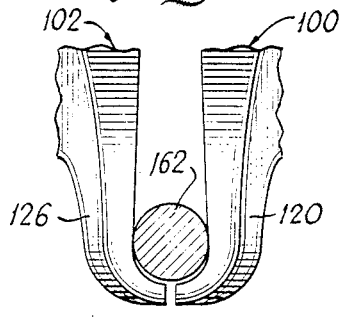
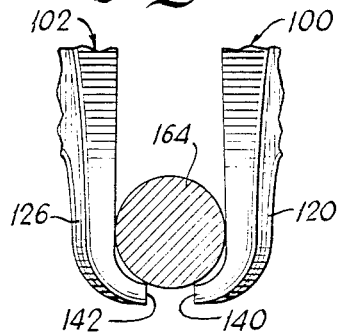
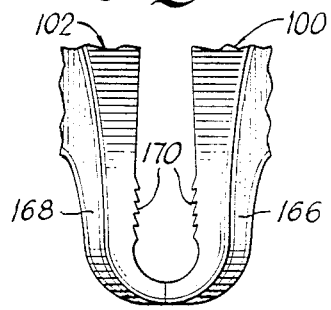

COMPARATIVE MECHANICAL FAULT DETECTION APPARATUS AND CLAMP

FIELD OF THE INVENTION

The present invention is directed to a method and device for determining, comparatively, a mechanical fault in an automotive vehicle by determining mechanical vibration comparatively between two like points on the vehicle to determine which of two automotive devices is in need of repair or replacement. More particularly, the present invention is directed to a comparative mechanical fault detector alternately operably connected to two piezoelectric devices connected through metal to two different, but like automotive vehicle devices. Each piezoelectric device is alternately connected, in succession to a single indicator means disposed within a passenger compartment of the automotive vehicle so that vibration, converted to an electrical signal amplitude proportional to the vibration, while both automotive devices are operated under normal load can be detected within the passenger compartment of the automotive vehicle alternately between each of the two like automotive vehicle devices to determine which of the two devices is in need of mechanical repair or replacement. In accordance with another important aspect of the present invention, an L-shaped mechanical clamp is particularly suitable for use with the comparative mechanical fault detector for connection to metallic automotive parts located in areas of small and low clearance.

BACKGROUND OF THE INVENTION AND PRIOR ART

It is well known to use the mechanical vibration detector as a means for determining whether, or at what point, a machine is in need of repair. One such device, manufactured by SPM Instrument, Inc. of Wallingford, Conn. is known as a VIBRAMETER VIB-10 and includes a piezoelectric device attachable to a machine, for example at an oil input nozzle, and capable of converting vibration through a metallic conductor to an electrical signal that is read as a digital output on a hand-held device. Another similar device manufactured by SPM Instrument, Inc. is called ELECTRONIC STETHESCOPE ELS-12 and includes a hand-held device having an extending, elongated metal probe capable of being disposed against machinery at any desired point and connected through a piezoelectric device for converting the detected vibration into an electrical signal which is amplified through a pair of speaker earphones so that the vibration is detected as a noise level.

These and other similar devices are well known in the art as a maintenance aid in detecting mechanical faults in machinery. Such maintenance aids have been very useful in determining the location of mechanical faults in a machine, such as in industrial machinery, since the machine can be turned on in its normal operating condition and the vibration detector can be attached to the machinery at various points of suspected mechanical failure until the disposition of the mechanical failure is determined. Until the method and device of the present invention, however, such vibration detectors have been practically useless in determining mechanical faults in an automotive device, particularly where it is necessary to operate the automobile in order to place the suspected mechanical device under normal load in order to cause the vibrational symptoms of the mechanical fault.

One particular mechanical fault called brinnelling is a mechanical fault in a wheel bearing assembly wherein rough lines are worn across the wheel bearing race as a result of impact loading or vibration causing vibration of the wheel bearing assembly which, generally, can only be detected when the wheel bearing assembly is under normal load, that is, while the automobile is operated under normal driving conditions with the full weight of the automobile on the wheels. Similarly, other mechanical faults in automotive wheel bearing assemblies, front or rear, and constant velocity (CV) joints usually can only be detected through vibration when the automobile is operated under normal driving conditions with the full weight of the automobile on the wheels. Thus, while some mechanical faults can be detected in an automotive vehicle device by normal operation of the automotive engine without moving the vehicle, for the most part, such vibration detectors such as those described and manufactured by SPM Instrument, Inc. are essentially inoperative for determining mechanical faults in automotive vehicle devices where vibrational fault symptoms occur only when the automotive vehicle is in motion, such as mechanical faults in wheel bearing assemblies and constant velocity joints.

Prior to the method and device of the present invention, it was almost impossible to determine the location of a mechanical fault in an automotive device during movement of the automobile, even when the mechanical fault caused a clearly audible vibration, since the vibration caused by a mechanical fault in an automotive device travels through any interconnected metal parts of the automobile and, therefore, can be audibly detected from many locations other than its source.

The above inadequacies in vibration detection devices for the purpose of determining a mechanical fault in an automotive device, particularly those automotive devices which have mechanical fault symptoms only during movement of the vehicle under normal load conditions, have been overcome in accordance with the method and device of the present invention.

SUMMARY OF THE INVENTION

In brief, the present invention is directed to a device for determining a mechanical fault in an automotive vehicle by determining mechanical vibration comparatively between two like points on the vehicle to determine which of two automotive devices is in need of repair or replacement. The device includes two piezoelectric devices operatively secured to a pair of mechanical clamps capable of being attached to two like points on the automotive vehicle, such as a pair of McPherson struts interconnected through metal parts to two front wheel bearing assemblies. In this manner, vibration caused by a mechanical fault in one of the wheel bearing assemblies will travel through the metal interconnection between the wheel bearing assembly and the point of clamp contact on the McPherson strut and is detected by the mechanical fault detector of the present invention when the fault detector is electrically interconnected to the mechanical clamp attached to the automotive vehicle near the faulty wheel bearing assembly.

In accordance with the device of the present invention, first and second piezoelectric devices can be alternatively switched to an operative position to provide first and second electrical signals indicative of mechanical vibration at the first and second clamped points interconnected through metal to two like automotive parts. An indicator means disposed within a passenger compartment of the automotive vehicle is connected to an electrical switch for alternatively and successively providing an indication of the amplitude of the first and second electrical signals, alternately detected, to achieve a comparative indication of the electrical signal amplitude at the clamped connections spaced equally from two like automotive vehicle parts.

Accordingly, an object of the present invention is to provide a new and improved method and device for determining a mechanical fault in an automotive vehicle by determining mechanical vibration comparatively between two like points on the vehicle.

Another object of the present invention is to provide a new and improved method and device for determining a mechanical fault in an automotive vehicle during movement of the vehicle under normal load conditions.

Another object of the present invention is to provide a new and improved method and device for determining a mechanical fault in an automotive vehicle by connecting first and second piezoelectric devices to first and second like points on the automotive vehicle where the first and second like points on the automotive vehicle are connected through metal to first and second automotive devices suspected of mechanical fault such that a vibrational symptom experienced in one of the suspected automotive devices will be detected by one of the piezoelectric devices and converted to an electrical signal having an amplitude greater than the amplitude of the electrical signal detected as a result of vibration received at the other piezoelectric device so that alternate connection of the first and second piezoelectric devices to an electrical signal indicating means disposed within the passenger compartment of the automotive vehicle during movement provides an accurate determination of which automotive device has a mechanical fault.

The above and other objects and advantages of the present invention will become apparent from the following detailed description of the present invention taken in conjunction with the drawings wherein:

FIG. 1 is a partial, perspective view of a front end of an automotive vehicle showing the comparative mechanical fault detector of the present invention connected to the tops of two McPherson struts connected through metal to two front wheel bearing assemblies;

FIG. 2 is a top elevational view of a mechanical clamp of the present invention for securing the mechanical fault detector of the present invention to or near an automotive part suspected of mechanical fault;

FIG. 3 is a front elevational view of the mechanical clamp of the present invention;

FIG. 4 is an elevational cross-sectional view of the mechanical clamp of the present invention taken through the line 4—4 of FIG. 3;

FIG. 5 is a top, elevational view taken through the line 5—5 of FIG. 1, showing the mechanical clamp of the present invention attached to a top, threaded shaft of a McPherson strut assembly;

FIG. 6 is a side, elevational view taken through the line 6—6 of FIG. 1, showing the mechanical clamp of the present invention attached to a top, threaded shaft of a McPherson strut assembly;

FIG. 7 is a top, elevational view taken through the line 7—7 of FIG. 1, showing the mechanical clamp of the present invention attached to a top, nut of a McPherson strut assembly;

FIG. 8 is a side elevational view taken through the line 8—8 of FIG. 1, showing the mechanical clamp of the present invention attached to a top nut of a McPherson strut assembly;

FIG. 9 is a partially broken away perspective view of a rear automotive suspension showing the mechanical clamp of the present invention attached to a nut extending from the rear axle and wheel bearing support structure;

FIG. 10 is an elevational front view showing the audible electrical signal indicating device of the present invention;

FIG. 11 is an electrical schematic representation of the audible electrical signal indicating device of FIG. 10;

FIGS. 12 and 13 are partially broken away, top elevational views showing the mechanical clamp of the present invention clamped onto two different diameter metallic rods capable of use as vibration detecting probes; and FIG. 14 is a partially broken away top elevational view of an alternate embodiment of the mechanical clamp of the present invention having serrated gripping surfaces.

DETAILED DESCRIPTION OF THE PREFERRED EMBODIMENT

Turning now to the drawings, and initially to FIG. 1, there is shown a comparative mechanical fault or vibration detection apparatus designated as a whole by reference numeral 10 including an electrical signal indicating device, generally designated 11, shown attached through two metal clamp devices of the present invention, generally designated by reference numerals 12 and 14, to two like automotive devices, such as McPherson strut assemblies 16 and 18 to determine which of two front wheel bearing assemblies has a mechanical fault. The mechanical fault detection apparatus 10 is connected to the McPherson strut assemblies 16 and 18 by the two metal clamps 12 and 14; the clamps 12 and 14 each include an operatively connected piezoelectric device such as piezoceramic transducer diaphragms generally designated 20 and 22, respectively; and a pair of conductors or electrically conducting wires 24 and 26 operatively connected to the piezoelectric devices 20 and 22 at one end and to an electrical switch, generally designated 28 at the other end.

Referring now to FIG. 11, there is shown an electrical schematic representation of the electrical signal indicating device 11 arranged in accordance with the principles of the present invention. As its major components, the electrical signal indicating device 11 includes an operating power source 30, a preamplifier circuit generally designated 32 for amplifying the low level signal input from the left and right piezoelectric transducers 20 and 22; an amplifier circuit 34 for amplifying the output signal of the preamplifier circuit 32 and a speaker 36 driven by the amplifier circuit 56 for generating an audible sound output.

A battery, such as a 9 volt transistor battery may be used for the operating power source 30. An enable switch 38 is connected in series with the battery 30 for activating and deactivating the comparative mechanical fault or vibration detection apparatus 10.

The preamplifier circuit 32 includes an NPN transistor 40 arranged with a biasing arrangement of resistors 42, 44 and 46 and a capacitor 48, as shown. A current limiting resistor 50 is connected between the enable switch 38 and the biasing resistor 46 for providing a supply voltage to the transistor 40. A filtering capacitor 52 is coupled between the junction of the series connected resistors 46 and 50 and ground. A coupling capacitor 54 is connected between the base of transistor 42 and a variable resistor 56 selectively coupled to the piezoelectric transducers 20 and 22 through the signal selector switch 38. Selector switch 58 is manually operable for alternately selecting a signal input from the left or right piezoelectric transducer 20 or 22 for a comparative vibration analysis between the left piezoelectric device 20 and the right piezoelectric device 22. The variable resistor 56 is manually adjustable for providing volume control of the electrical signal indicating device 11.

An amplified output signal of the preamplifier circuit 32 at the collector of the transistor 40 is coupled to the amplifier circuit 34 through a coupling capacitor 60. The amplifier circuit 34 includes a linear, audio frequency AF amplifier 62. The amplifier 62 can be implemented with an integrated circuit device such as a National Semiconductor device type LM386. A biasing resistor 64 and external capacitor 66 is used in conjunction with the amplifier 62. A voltage supply filter capacitor 68 is connected across the series combination of the battery 30 and the enable switch 38 for filtering the voltage supply for the amplifier 62. A series combination of a capacitor 70 and a resistor 72 is connected between an output of the amplifier 62 and ground. The output of the amplifier 62 is applied to the speaker 36 through a coupling capacitor 74.

In operation, an audible sound output of the speaker 36 is produced responsive to mechanical vibrations sensed by the selected transducer 20 or 22. While the electrical signal indicating device 11 is shown in the preferred embodiment to provide an audible reading of the electrical signal amplitudes from the piezoelectric devices 20 and 22, obviously, the indicating means 11 could be constructed to provide a digital or an analog meter display for comparison of the electrical signals.

The following list provides exemplary circuit components that have been used in one implementation of the vibration detection apparatus 10. However, these circuit components are intended to be merely illustrative and should not be interpreted in any limiting sense speaker 36: 16 ohm
 transistor 40: 2SC1815
 resistor 42: 270 ohms
 resistor 44: 82K ohms
 resistor 46: 6.8K ohms
 capacitor 48: 330 picofarad
 resistors 50 and 64: 10K ohms
 capacitor 52: 10 microfarad
 capacitors 54 and 56: 4.7 microfarad
 amplifier 62: LM386
 capacitor 66: 10 microfarad
 capacitor 68: 47 microfarad
 capacitor 70: 0.033 microfarad
 resistor 72: 10 ohms
 capacitor 74: 100 microfarad As best shown in FIG. 2, each mechanical clamp of the present invention 12 and 14 has a piezoelectric device 20 or 22 secured to an interior sidewall 76, as shown in FIG. 2. The piezoelectric device 20, as well known in the art, includes a larger diameter metal base plate 78 adhesively secured to the interior sidewall 76 with a rigid but non-brittle adhesive such as a rigid epoxy resin (not shown) to secure the metal base plate 78 to the clamp 12 at the interior sidewall 76. Lying above the metal base plate 78 is a quartz crystal 80 electrically connected to conductor 24 (grounded to the clamp at 25) by metallic interconnection or solder 82.

In operation, as shown in FIGS. 1 and 2, vibration received by clamp 12 at the top of the McPherson strut assembly 16 as a result of a mechanical fault in a left front wheel bearing assembly, generally designated 84, causes flexing of the quartz crystal 80 of piezoelectric device 20 causing an electrical signal to be transmitted through the conductor 24, the electrical signal amplitude being proportional to the amount of vibration experienced at the clamp 12. The electrical signal received through the conductor 24 at the electrical signal indicating device 11 can be audibly heard through speaker 36 and compared to a similar signal received from clamp 14 on the top of the right McPherson strut assembly 18 by turning switch 28 from the left to right positions, as shown in FIG. 10. The degree of noise output from speaker 36 will be proportional to the amount of vibration experienced at the left front wheel bearing assembly 84, and, comparatively, the right front wheel bearing assembly generally designated 86. In this manner, it can be determined which of the wheel bearing assemblies 84 or 86 is in need of repair or replacement.

Similarly, as shown in FIG. 9, the mechanical clamps 12 and 14 of the present invention can be attached to a mechanical automotive part metalically interconnected to a wheel rear bearing assembly (not shown) such as at an extending nut 88 protruding from an axle and wheel bearing support structure 90. The left clamp 12, not shown in FIG. 9, is positioned on a nut protruding from the opposite axle and wheel bearing support structure which structurally corresponds to protruding nut 88 on the opposite side of the rear of the vehicle. Similarly, since the clamps 12 and 14 are connected to like parts on the vehicle, comparing the electrical signal amplitude from the electrical signal indicating device 11 when switched from left to right will be an accurate indication of which rear wheel bearing assembly is in need of mechanical repair or replacement. As shown in FIG. 10, the electrical signal indicating device 11 includes an earphone jack 92 operatively connectable to earphones for receiving an audible output directly to earphone speakers (not shown) instead of through speaker 36.

In operation, the clamps 12 and 14 are secured to like and opposite automotive parts, such as the top of McPherson struts 16 and 18, as shown in FIG. 1; the electrical signal indicating device 11 is positioned within the driver or passenger compartment of the automotive vehicle; the conductors 24 and 26 then are operatively attached to left and right conductor inputs 94 and 96 in the electrical signal indicating device 11 and the automotive vehicle is operated under normal load conditions while comparatively moving switch 28 from left to right positions for an audible comparison to determine which wheel bearing is in need of repair or replacement. As shown in FIG. 10, the electrical signal indicating device 11 includes a volume dial 98 to increase or decrease the audible output from the electrical signal indicating device 11 and is maintained in a constant position during movement of switch 28 from left to right positions to obtain an accurate comparative indication to determine whether the left or right automotive device is in need of repair or replacement.

As shown in FIGS. 2-8 and 12-14, the mechanical clamp, constructed in accordance with the principles of the present invention, is, overall, in an L-shaped configuration including a pair of opposite clamp arms, generally designated 100 and 102, pivotally interconnected through pivot pin 104. A coil spring 106 disposed around the pivot pin 104 includes free spring end portions 108 and 110 disposed against inner walls of handle portions 112 and 114 of the clamp 12. Accordingly, the clamp 12 is normally spring biased in the closed position, as shown in FIGS. 2, 4 and 14. Compressing the handle portions 112 and 114 by hand to converge the two handles together separates the opposite clamp arms 100 and 102 at a nose or end portion of the clamp 12, generally designated 116 to enable the nose or end of the clamp 116 to be separated and clamped about an automotive part, as shown in FIGS. 5-8, under car hood 117.

As best shown in FIGS. 3, 4 and 6, each of the clamp arms 100 and 102 is constructed of rigid, hardened steel when used as a comparative mechanical fault detector having integral piezoelectric devices and generally configured in an elongated, L-shaped configuration. When otherwise used as an electrical clamp, such as a battery cable clamp, a battery charger clamp or for other electrical test equipment, the clamps are formed or cast from any conductive metal, such as copper and the like. Clamp arm 102 includes an elongated leg portion 118 extending transversely generally forwardly from pivot pin 104 and integral with a downwardly extending, curved foot portion 120 terminating in a leading and inwardly extending nose portion 122. Similarly, L-shaped clamp arm 100 includes a leg portion 124 transversely extending forwardly from pivot pin 104 integral with a foot portion 126 curving downwardly from leg portion 124 and terminating at a free end at a leading and inwardly extending nose portion 128.

As best shown in FIGS. 3 and 4, the L-shaped clamp arm 102 is formed or cast from hardened steel in a U-shaped cross-sectional configuration comprising a pair of transverse leg portions 130 and 132 integrally connected by a longitudinal base portion forming clamp sidewall 134. Similarly, the opposite clamp arm 100 also is formed or cast from hardened steel in a U-shaped cross-sectional configuration (clamp lever arm 100 being a mirror image of clamp lever arm 102) having an upper transverse leg portion 136, and a lower transverse leg portion 138 integrally connected by a longitudinal base portion forming clamp sidewall 76. The leg portions 130 and 132 of lever arm 102 extend transversely inwardly toward the leg portions 136 and 138 of lever arm 100.

As best shown in FIGS. 4 and 6, the U-shaped cross-sectional configuration of clamp lever arm 102 extends downwardly from leg portion 118 to form the integral foot portion 120 of L-shaped lever arm 102. The foot portion 120, like leg portion 118, has a generally U-shaped cross-sectional configuration as does foot portion 126 extending downwardly from and integral with leg portion 124 of L-shaped lever arm 100. The foot portions 120 and 126 of lever arms 102 and 100, respectively, also have U-shaped cross-sectional configurations integrally extending from the U-shaped cross-sectional configurations of the leg portions 118 and 124 of clamp arms 102 and 100 to extend inwardly toward an opposite foot portion. Foot portion 120 terminates at innermost and leading free edge 140 and foot portion 126 terminates at an innermost and leading free edge 142 forming forward leading edges of the nose portion 116 of the clamp 12.

Clamp nose 116 is formed from the pair of leading and inwardly extending nose portions 122 and 128 formed by leading free edges 140 and 142, respectively. Sidewalls 134 and 76 of the clamp 12 extend forwardly and downwardly to form internal sidewalls of foot portions 120 and 126 and the sidewalls 134 and 76 continue integrally inwardly forming bottom clamp walls 144 and 146 (FIG. 3) terminating at the bottom clamp edges 148 and 150, adapted for clamping contact onto an automotive part. The leading and inwardly extending nose portions 122 and 128 form forwardmost projections extending inwardly from bottom clamp edges 148 and 150, respectively. As best shown in FIGS. 5 and 7, these nose portion projections 122 and 128 are particularly suitable for securing the clamp 12 onto opposite nut corners 152 and 154 (FIG. 7) to prevent the clamp from inadvertent removal from nut corners 152 and 154, with a portion of the bottom clamp edges 148 and 150 in clamping contact against flat nut side edges 156 and 158.

In accordance with another important feature of the present invention, the projecting nose portions 122 and 128 inwardly projecting in a forwardmost position from the bottom clamp walls 144 and 146, respectively, enable the bottom clamp edges 148 and 150 to be securely attached to a threaded bolt end 160 (FIGS. 5 and 6) or on an unthreaded circular shaft or rod. As best shown in FIG. 2, the bottom clamp edges 148 and 150 are shaped to diverge forwardly toward the leading and inwardly extending nose portions 122 and 128 to form a V-shaped aperture in the adjacent bottom clamp walls 144 and 146 when the bottom clamp walls 144 and 146 are spring biased to their innermost positions, as shown in FIG. 2. This configuration for bottom clamp edges 148 and 150 together with the inwardly projecting and leading nose portions 122 and 128 provides a surprisingly effective clamping mechanism for securing the clamp 12 to a wide variety of automotive part shapes, as shown in FIGS. 5-8. The clamps of the present invention are useful in any environment such as for jumper cables and the like and in arts other than the automotive art. Further, as shown in FIGS. 12 and 13, the U-shaped cross-sectional configuration of the clamp arms 100 and 102 enable the feet portions 120 and 126 to grip metallic probes 162 and 164 of various diameters to enable each clamp to be used singly in a stethescope fashion for determining mechanical faults in machinery other than automotive parts which need to be under normal load conditions to experience vibrational symptoms.

As shown in FIG. 14, in accordance with another embodiment of the mechanical clamp of the present invention, a leading upper edge 166 and 168 of the foot portions 120 and 126 include a pair of oppositely facing jagged or serrated edges 170 and 172 to more securely grip a mechanical probe 162 or 164 or other automotive or non-automotive parts in accordance with the principles of the present invention.

While there has been described what is at present considered to be the preferred embodiment of the invention, it will be understood that various modifications may be made therein which are within the true spirit and scope of the invention.

What is claimed as new and desired to be secured by Letters Patent of the United States is:

1. A method of determining a mechanical fault in an automotive vehicle by determining mechanical vibration comparatively between two like points on the vehicle to determine which of two automotive devices is in need of repair or replacement comprising operatively interconnecting a first piezoelectric device to a first automotive device suspected of mechanical fault; operatively interconnecting a second piezoelectric device to a second, like automotive device suspected of mechanical fault, wherein said first and second piezoelectric devices are operatively and alternately electrically connected to an indicator means for indicating an electrical signal amplitude proportional to mechanical vibration; and alternatively connecting said first and second piezoelectrical devices to said indicator means to comparatively determine the larger amplitude of the two electrical signals and thereby determine which automotive device has a mechanical fault said method including a disposing said indicator means within a passenger compartment of the automotive vehicle and driving the automotive vehicle to operate said first and second automotive devices while the automobile is moving and place the automotive devices under normal load to determine the mechanical fault under normal operating conditions, and alternately switching the indicator means in operative position from one of the piezoelectric devices to the other piezoelectric device to determine, under normal operating conditions, which of the automotive devices has a mechanical fault.

2. The method of claim 1 wherein the first piezoelectric device is operatively attached to a first clamp and said second piezoelectric device is operatively attached to a second clamp and wherein said first clamp is operatively interconnected to said first automotive device at a first exposed metal automotive part connected through metal to said first automotive device, and said second clamp is operatively interconnected to said second automotive device at a second exposed metal automotive part connected through metal to said second automotive device.

3. A method of determining a mechanical fault in an automotive wheel bearing assembly in an automotive vehicle comprising:
  operatively interconnecting a first piezoelectric transducer to a first front wheel strut assembly;
  operatively interconnecting a second piezoelectric transducer to a second front wheel strut assembly wherein said first and second piezoelectric transducers are alternately connectable through a conductor to an indicator means for indicating an electrical signal amplitude proportional to a degree of mechanical vibration;
  driving the automotive vehicle to operate the wheel bearings under normal load conditions;
  alternately switching the indicator means to operatively connect from said first piezoelectric device to said second piezoelectric device while the automobile is moving so that the wheel bearings are under normal load conditions to obtain an indication of the amplitude of the electrical signals from both of said piezoelectric devices; and
  comparing the electrical signal amplitude from said first and second piezoelectric devices while the automobile is moving to determine which front wheel bearing is faulty.

4. A comparative mechanical fault detector comprising:
  a first piezoelectric device interconnected to a first metal clamp means, said first clamp means spring biased for attachment to a first metal automotive part;
  a second piezoelectric device interconnected to a second metal clamp means, said second clamp means spring biased for attachment to a second metal automotive part;
  said first and second metal clamp means each including a pair of rigid elongated L-shaped, metal lever arms hingedly connected at a hinge pin disposed between front connecting ends forming part of a foot portion of each L-shaped lever arm and a handle end forming a leg portion of each L-shaped lever arm, said lever arms being spring biased to force the connecting ends of the lever arms to converge toward each other, so that the connecting ends of the lever arms will diverge against the spring biasing force for attachment to said automotive part, said connecting ends of said foot portions of said lever arms each including an elongated edge for attachment to said automotive part, said elongated edges shaped to diverge toward a leading and extending nose portion, said nose portions extending inwardly toward each other for clamping contact against said automotive part;
  a first electrical conductor operatively attached to said first piezoelectric device and to an electrical switch;
  a second electrical conductor operatively attached to said second piezoelectric device and to an electrical switch such that said first and second piezoelectric devices can be alternatively switched to an operative position to provide first and second electrical signals indicative of mechanical vibration at the first and second clamped automotive parts, respectively; and
  indicator means alternatively operatively connected to said electrical switch for providing an indication of the amplitude of the first and second electrical signals.

5. The comparative mechanical fault detector of claim 4 wherein the first and second metal clamp means are L-shaped and each includes a depending nose portion for attachment to a metal automotive part without extending substantially upwardly from the automotive part.

6. The comparative mechanical fault detector of claim 4 wherein the first piezoelectric transducer is operatively secured to an inner wall of the first metal clamp means and the second piezoelectric transducer is operatively secured to an inner wall portion of the second metal clamp means.

7. The comparative mechanical fault detector of claim 6 wherein the piezoelectric transducer includes a metal base portion secured to a rigid sidewall of the clamp with a rigid epoxy resin.

8. A clamp for attachment to recessed or difficult to reach workpieces comprising a pair of rigid, elongated L-shaped metal lever arms pivotally connected at a pivot pin longitudinally disposed between a front, connecting end, and a handle end said connecting end forming a foot portion of each L-shaped lever arm and the handle end forming a leg portion of each L-shaped lever arm, said lever arms being spring biased to force the connecting foot ends of the lever arms to converge toward each other at a leading and inwardly extending clamp nose so that the connecting ends will diverge against the spring biasing force for attachment to said workpiece, said connecting ends of said foot portions of said lever arms each including elongated edges for attachment to said workpiece, said elongated edges shaped to diverge toward the clamp nose, said nose portions extending inwardly toward each other for clamping contact against said workpiece.

9. The clamp of claim 8 wherein each lever arm is formed or cast from hardened steel in a U-shaped cross-sectional configuration with a base of the U-shaped lever arm forming opposite extension sidewalls of the clamp with the legs of the U-shaped lever arm extending inwardly toward the legs of the other U-shaped lever arm; each lever arm being L-shaped with a foot portion of each L-shaped lever arm extending downwardly from a leg portion of each L-shaped lever arm, each foot portion having a generally U-shaped cross-sectional configuration, said foot portions of said lever arms projecting inwardly toward each other at free edges thereof to form said clamp nose, said free edges forming said clamp nose having an inwardly projecting foot portion being at a forward end of the clamp.

* * * * *